(12) United States Patent
Wang et al.

(10) Patent No.: US 10,395,849 B2
(45) Date of Patent: *Aug. 27, 2019

(54) ELECTRODE PLATE USING GERMANIUM FILM, MANUFACTURING METHOD THEREOF, AND ENERGY STORAGE DEVICE

(71) Applicant: BOE TECHNOLOGY GROUP CO., LTD., Beijing (CN)

(72) Inventors: Long Wang, Beijing (CN); Yanzhao Li, Beijing (CN); Yong Qiao, Beijing (CN); Yongchun Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 311 days.

This patent is subject to a terminal disclaimer.

(21) Appl. No.: 14/785,772

(22) PCT Filed: May 29, 2015

(86) PCT No.: PCT/CN2015/080150
§ 371 (c)(1),
(2) Date: Oct. 20, 2015

(87) PCT Pub. No.: WO2016/086629
PCT Pub. Date: Jun. 9, 2016

(65) Prior Publication Data
US 2016/0189880 A1      Jun. 30, 2016

(30) Foreign Application Priority Data
Dec. 3, 2014   (CN) .......................... 2014 1 0729267

(51) Int. Cl.
*H01G 11/26*   (2013.01)
*H01G 11/30*   (2013.01)
(Continued)

(52) U.S. Cl.
CPC ............. *H01G 11/24* (2013.01); *H01G 11/26* (2013.01); *H01G 11/30* (2013.01); *H01G 11/86* (2013.01);
(Continued)

(58) Field of Classification Search
None
See application file for complete search history.

(56) References Cited

U.S. PATENT DOCUMENTS 4,716,048 A * 12/1987 Ishihara ............... H01L 21/0237
136/258
5,620,906 A    4/1997 Yamaguchi et al.
(Continued)

FOREIGN PATENT DOCUMENTS

CN          1654707 A      8/2005
CN        101246927 A      8/2008
(Continued)

OTHER PUBLICATIONS

International Search Report and Written Opinion dated Aug. 17, 2015 from State Intellectual Property Office of the P.R. China.
(Continued)

*Primary Examiner* — Lucas J. O'Donnell
(74) *Attorney, Agent, or Firm* — Dilworth & Barrese, LLP.; Michael J. Musella, Esq.

(57) ABSTRACT

An electrode plate, a manufacturing method thereof, and an energy storage device are disclosed. The method for manufacturing an electrode plate includes: forming a germanium film on a metal substrate; carrying out a topology treatment on the germanium film by using a functionalization element, to obtain the electrode plate with a topological semiconductor characteristic. The electrode plate prepared by the above method has a high conductivity and a low internal resistance.

16 Claims, 2 Drawing Sheets

(51) Int. Cl.
  *H01G 11/24*   (2013.01)
  *H01M 4/139*   (2010.01)
  *H01M 4/04*    (2006.01)
  *H01M 4/66*    (2006.01)
  *H01G 11/86*   (2013.01)
  *H01M 10/052*  (2010.01)

(52) U.S. Cl.
  CPC ....... *H01M 4/0404* (2013.01); *H01M 4/0423* (2013.01); *H01M 4/0426* (2013.01); *H01M 4/0428* (2013.01); *H01M 4/139* (2013.01); *H01M 4/661* (2013.01); *H01M 4/667* (2013.01); *H01M 10/052* (2013.01); *Y02E 60/13* (2013.01)

(56) References Cited

U.S. PATENT DOCUMENTS

| | | | |
|---|---|---|---|
| 6,380,560 | B1 | 4/2002 | Yamazaki et al. |
| 8,304,780 | B2 | 11/2012 | Kamath |
| 9,704,891 | B2* | 7/2017 | Li .................. H01L 27/124 |
| 2004/0197945 | A1* | 10/2004 | Woelk .................. C07F 7/0807 438/99 |
| 2005/0224452 | A1* | 10/2005 | Spiess .................. B82Y 10/00 216/41 |
| 2008/0026289 | A1* | 1/2008 | Masahara ........... H01M 4/0426 429/188 |
| 2010/0151666 | A1* | 6/2010 | Kouvetakis ............. C01B 33/08 438/488 |
| 2012/0161209 | A1 | 6/2012 | Yasdani |
| 2012/0273763 | A1 | 11/2012 | Banerjee |
| 2013/0037798 | A1 | 2/2013 | Wong et al. |
| 2013/0078788 | A1* | 3/2013 | Suguro ............. H01L 21/26513 438/513 |
| 2013/0273402 | A1 | 10/2013 | Tsutsumi |
| 2016/0189880 | A1 | 6/2016 | Wang et al. |
| 2016/0197274 | A1 | 7/2016 | Li et al. |
| 2016/0202795 | A1 | 7/2016 | Wang et al. |
| 2016/0284394 | A1 | 9/2016 | Tominaga |
| 2016/0359077 | A1 | 12/2016 | Li et al. |

FOREIGN PATENT DOCUMENTS

| | | |
|---|---|---|
| CN | 101859814 A | 10/2010 |
| CN | 103238101 A | 8/2013 |
| CN | 103643287 A | 3/2014 |
| CN | 103956471   | 7/2014 |
| CN | 104099578 A | 10/2014 |
| CN | 104156109   | 11/2014 |
| CN | 104157698 A | 11/2014 |
| CN | 104362298 A | 2/2015 |
| CN | 104392931 A | 3/2015 |
| EP | 2629086 A1  | 8/2013 |
| JP | H04249374 A | 9/1992 |
| KR | 20040008614 A | 1/2004 |
| WO | 2013035686 A1 | 3/2013 |
| WO | 2014093681 A1 | 8/2014 |

OTHER PUBLICATIONS

Second Chinese Office Action dated Dec. 16, 2016.
Chinese Office Action dated May 5, 2016.
International Search Report dated Sep. 10, 2016.
First Chinese Action dated Oct. 9, 2016.
Second Chinese Office Action dated Apr. 5, 2017.
Office Action issued in U.S. Appl. No. 14/891,091 dated Dec. 12, 2016.
Notice of Allowance issued in U.S. Appl. No. 14/891,091, dated Jun. 22, 2017.
Requirement for Restriction issued in U.S. Appl. No. 14/891,091, dated Jul. 25, 2016.
Akira Heya et al., "Improvement of poly-Ge TFT Characteristics by atomic hydrogen annealing," Active-Matrix Flatpanel Displays and Devices (AM-FPD), 2015 22nd International Workshops on IEEE, 2015.
Bianco, Elisabeth, et al. "Stability and exfoliation of germane a germanium graphane analogue," Acs Nano 7.5 (2013): 4414-4421.
Xu, Yogn, et al. "Large-gap quantum spin Hall insulators in tin films." Physical review letters 111,13 (2013): 136804.
Fourth Chinese Office action dated Apr. 4, 2018.

* cited by examiner

ELECTRODE PLATE USING GERMANIUM FILM, MANUFACTURING METHOD THEREOF, AND ENERGY STORAGE DEVICE

TECHNICAL FIELD

At least one embodiment of the present invention relates to an electrode plate, a manufacturing method thereof, and an energy storage device.

BACKGROUND

In recent years, under a social environment in which energy supply is limited and people pays great attention to environmental pollution, lithium ion batteries, fuel cells, and super capacitors, which are less pollutional and more environmentally friendly, have attracted people's attention. An electrode material is an important component for an energy storage component such as fuel cells, lithium ion batteries, and super capacitors, and is a key factor influencing energy storage performance, life, and production cost of a component. The development of an electrode with high electrical conductivity, higher capacity, and higher energy storage density is importance in this art.

SUMMARY

An embodiment of the present invention provides an electrode plate, manufacturing method thereof, and an energy storage device. An electrode plate manufactured by this method has a high electrical conductivity and a low internal resistance.

At least one embodiment of the present invention provides a method for manufacturing an electrode plate, comprising forming a germanium film on a metal substrate; and carrying out a topology treatment on the germanium film with a functionalization element, to obtain the electrode plate with a topological semiconductor characteristic.

At least one embodiment of the present invention further provides an electrode plate, comprising a metal substrate and a film comprising germanium being disposed on the metal substrate and having a topological semiconductor characteristic.

At least one embodiment of the present invention further provides an energy storage device comprising the above mentioned electrode plate.

BRIEF DESCRIPTION OF THE DRAWINGS

Drawings for embodiments will be described briefly, to illustrate the technical solution of the present invention more clearly. Obviously, each drawing in the following description refers only to some embodiments according to the present invention, and will not limit the present invention.

DETAILED DESCRIPTION

Figure 1:
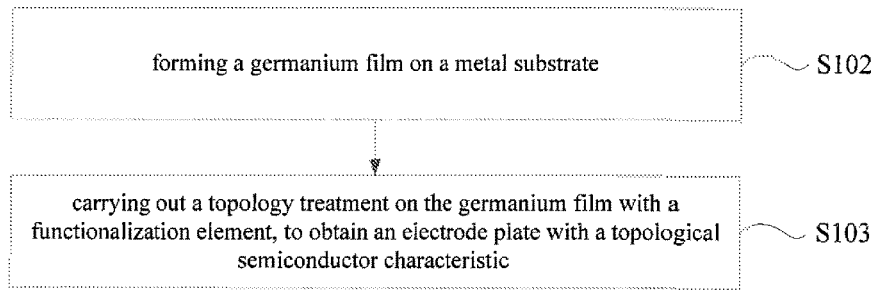
FIG. 1 is a flow chart of a method for manufacturing an electrode plate provided in an embodiment according to the present invention.

The technical solution of an embodiment of the present invention will be described clearly and completely, with reference to the drawing for embodiments of the present invention, to make objectives, technical solutions and advantages of each embodiment of the present invention more clear. Obviously, each embodiment described is a part of, not all, embodiments of the present invention. Any other embodiments which are obtainable by a skilled person in the art on the basis of the described embodiments according to the present invention without any inventive work will fall within the protection scope of the present invention.

With reference to FIG. 1, it is a flow chart of a method for manufacturing an electrode plate provided in an embodiment according to the present invention.

As shown in FIG. 1, a method for manufacturing an electrode plate provided in at least one embodiment according to the present invention, comprising: Step S102: forming a germanium film on a metal substrate; and step S103: carrying out a topology treatment on the germanium film with a functionalization element, to obtain the electrode plate with topological semiconductor characteristics.

In a method provided in each embodiment according to the present invention, a germanium film refers to a film formed by germanium; and a topological semiconductor characteristic refers to a characteristic of a material wherein an inner part of the material is in an insulative state whereas a surface or an edge of the material is in a conductive state. A film can be provided with a topological semiconductor characteristic by carrying out a certain treatment on a film formed with germanium using halogen or another element. Such treatment is referred to as a "topology treatment", and halogen or another element used in the treatment is referred to as a "functionalization element".

In a method for manufacturing the above mentioned electrode plate, through the step S013, a germanium film is subjected to a topology treatment, such that an electrode plate with a topological semiconductor characteristic can be obtained. A topological semiconductor (i.e. a germanium film being subjected to a topology treatment) thus prepared has characteristics such as high electrical conductivity and small internal resistance, and its theoretical resistance under normal temperature can reach 0. Therefore, an electrode plate manufactured according to the above mentioned method has a high electrical conductivity and a small internal resistance.

Furthermore, because a germanium film has characteristics such as high specific surface area and good stability and flexibility, a film obtained after topology treatment of the germanium film also has the same characteristics. Therefore, an electrode plate manufactured by the above mentioned method has a higher specific surface area and better stability.

As shown in FIG. 1, in at least one embodiment, the formation of a germanium film in step S102 can be achieved by e.g. one of the following Schemes, which will be illustrated one by one in the following paragraphs.

Scheme 1: forming a germanium film by using an atomic layer deposition method.

Scheme 2: forming a germanium film by using a chemical vapor deposition method.

Scheme 3: forming a germanium film by using a mechanical exfoliation transferring method.

Scheme 4: forming a germanium film by using a magnetron sputtering method.

Scheme 5: forming a germanium film by using a pulsed laser deposition method.

On the basis of the above mentioned embodiments, in at least one embodiment, a functionalization element in step S103 can comprise fluorine, chlorine, bromine, or iodine.

As shown in FIG. 1, on the basis of the above mentioned embodiments, in at least one embodiment, carrying out the topology treatment on the germanium film with a functionalization element in step S103 to obtain the electrode plate with a topological semiconductor characteristic comprises, for example, carrying out halogenation treatment on the germanium film with fluorine, chlorine, bromine, or iodine, to obtain a germanium halide film. A germanium halide film has a typical topological semiconductor characteristic.

On the basis of the above mentioned embodiments, in at least one embodiment, the germanium halide film can be a single-atom-layer germanium halide film; or, the germanium halide film can be a double-atom-layer germanium halide film; or, the germanium halide film can be a multiple-atom-layer germanium halide film.

On the basis of the above mentioned embodiments, in at least one embodiment, halogenation of the germanium film can be carried out according to the following schemes 1-4, which will be illustrated in the following paragraphs.

Scheme 1: Carrying Out Halogenation of the Germanium Film by Using a Gas Phase Method.

For example, and the above mentioned scheme 1 can comprise: carrying out halogenation treatment on a germanium film under a bromine gas atmosphere with the gas pressure being 1-10 Pa and the treatment temperature being 50-400 Celsius degree, in which the germanium film can be halogenated with bromine gas to form a germanium bromide film with a topological semiconductor characteristic; or, carrying out annealing on a germanium film under a chlorine atmosphere at a treatment temperature of 50-400 Celsius degree for 10 min, to form a germanium chloride film with a topological semiconductor characteristic; or carrying out halogenation treatment on the germanium film under a iodine gas atmosphere with a gas pressure being 1-10 Pa and a treatment temperature being 60-100 Celsius degree, to form a germanium iodide film with a topological semiconductor characteristic; or, carrying out halogenation treatment on the germanium film under a $BCl_3$ gas atmosphere with a gas pressure being 1-10 Pa and a treatment temperature being 250-350 Celsius degree, and carrying out annealing under halogen gas atmosphere at 90-130 Celsius degree, to form a germanium chloride film with a topological semiconductor characteristic.

Scheme 2: Carrying Out Halogenation Treatment on the Germanium Film by Using a Liquid Phase Method.

For example, the above mentioned scheme 2 can comprise: carrying out halogenation treatment on the germanium film in a liquid bromine environment with a concentration of the liquid bromine being 1%-10% and a treatment temperature being 40-80 Celsius degree, to form a germanium bromide film with a topological semiconductor characteristic.

Scheme 3: Carrying Out Halogenation Treatment on the Germanium Film by Using a Surface Modification Method For example, the above mentioned scheme 3 can comprise: firstly, coating an organic colloidal material comprising a halogen onto a substrate; and then laminating the substrate coated with the organic film on the substrate deposited with a germanium film, to make atomic groups comprising halogen atoms in the organic film transferred to the germanium film, by utilizing hydrophilic or hydrophobic characteristics of the atomic groups, to achieve the halogenation of the germanium film, the reaction for topology treatment on the germanium film using a surface modification method can be carried out at a temperature near room temperature.

Scheme 4: Carrying Out Halogenation Treatment on a Germanium Film by Using a Plasma Treatment Method.

For example, the above mentioned scheme 4 can comprise: in a device such as an inductively coupled plasma (ICP) device or a reactive ion etching (RIE) device, by using chlorine or carbon tetrachloride as a reaction gas, a halogen plasma will bomb a surface of a germanium film, and in turn might be adsorbed in the germanium film, to achieve halogenation of the germanium film. In the case where the topology treatment of the germanium film is carried out by using a plasma treatment method, the treatment temperature is lower and a surface of a film layer can be more even.

As shown in FIG. 1, on the basis of the above mentioned embodiments, in at least one embodiment, in step S103, the functionalization element can further comprise hydrogen, nitrogen, boron, or sulfur.

Figure 4:
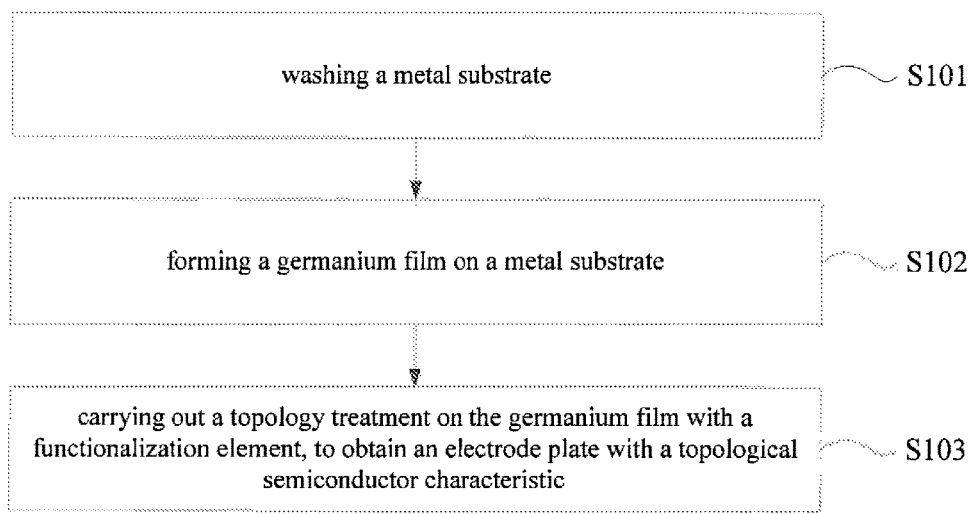
FIG. 4 is a flow chart of a method for manufacturing another electrode plate provided in an embodiment according to the present invention.

As shown in FIG. 4, on the basis of the above mentioned embodiments, in at least one embodiment, in step S102, the method for manufacturing the electrode plate can further comprises step S101: before forming a germanium film on the metal substrate, washing the metal substrate.

Figure 2:
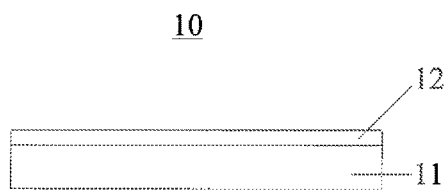
FIG. 2 is a structural schematic diagram of an electrode plate provided in an embodiment according to the present invention.

At least one embodiment of the present invention further provides an electrode plate manufactured by using the method for manufacturing the electrode plate according to any one of the above mentioned embodiments. As shown in FIG. 2, the electrode plate 10 comprises metal substrate 11 and film 12 comprising germanium disposed on the metal substrate 11 and having a topological semiconductor characteristic. The above mentioned electrode plate has characteristics such as a high electrical conductivity, a small internal resistance, a higher specific surface area, and better stability.

In at least one embodiment, film 12 can be a germanium halide film formed by carrying out halogenation of a germanium film with fluorine, chlorine, bromine, or iodine.

On the basis of the above mentioned embodiments, for example, the germanium halide film can be a single-atom-layer germanium halide film, a double-atom-layer germanium halide film, or a multiple-atom-layer germanium halide film.

In at least one another embodiment, the film 12 can be a topological semiconductor film formed by carrying out topology treatment on a germanium film by using hydrogen, nitrogen, boron, or sulfur.

On the basis of the above mentioned embodiments, in at least one embodiment, the metal substrate 11 can be a gold foil, an aluminum foil, a platinum foil, a copper foil, or a nickel foil, etc., provided that it is a metal having good electrical conductivity.

Figure 3:
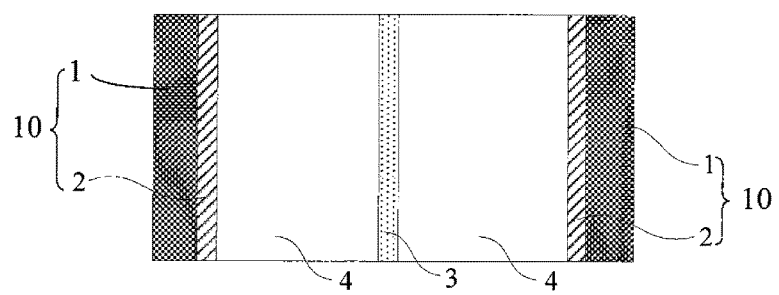
FIG. 3 is a structural schematic diagram of a super capacitor provided in an embodiment according to the present invention.

As shown in FIG. 3, in at least one embodiment, the present invention also provides an energy storage device which comprises the electrode plate 10 provided in the above mentioned embodiments. The above mentioned energy storage device can be a battery or a capacitor, etc., such a lithium ion battery, a fuel cell, and a super capacitor. FIG. 3 only illustrates a super capacitor, as an embodiment of an energy storage device.

On the basis of the above mentioned embodiments, as shown in FIG. 3, in at least one embodiment, the present invention further provides a method for the manufacturing of a super capacitor, comprising: depositing a super-thin atomic layer germanium halide film on the electrical conductive plate 1 by using the above mentioned method for manufacturing the electrode plate, to form two electrode plates 10, wherein each plate 10 comprises an electrical conductive plate 1 (i.e. an metal substrate) and a germanium halide film 2 disposed thereon, and such conductive plate 1 can be a gold foil, a platinum plate, an aluminum foil, a copper foil, or a nickel foil, etc. The above mentioned two electrode plates 10 is employed as a positive electrode plate and a negative electrode plate of a super capacitor, respectively. Further disposing a barrier film 3 between the positive electrode plate and the negative electrode plate, and then disposing the conductive plate 1 thus obtained into a case, injection an electrolyte 4, and then sealing the injection inlet, to obtain a super capacitor. Because a super-thin atomic layer germanium halide film is deposited on electrical conductive plate 1, which may enhance a specific surface area of the electrode plate 10, a capacitor thus obtained can have stronger storage capacity for electric charge.

The embodiments described above are only illustrative, not restrictive, embodiments of the present invention. The protection scope of the present invention is determined by accompanying claims.

The present application claims the priority of Chinese Patent Application No. 201410729267.4, filed on Dec. 3, 2014, whose disclosure is incorporated in entire by reference, as a part of the present invention.

What is claimed is:

1. A method for manufacturing an electrode plate, comprising:
    forming a germanium film on a metal substrate, wherein the germanium film consists of germanium;
    carrying out a topology treatment on the germanium film by using a functionalization element, to obtain the germanium film having a topological semiconductor characteristic;
    wherein the functionalization element comprises at least one selected from the group consisting of fluorine, chlorine, bromine, or iodine;
    carrying out the topology treatment on the germanium film using the functionalization element to obtain the germanium film having the topological semiconductor characteristic comprises:
        carrying out a halogenation treatment on the germanium film by using fluorine, chlorine, bromine, or iodine, to obtain a germanium halide film, and
    wherein the germanium film having the topological semiconductor characteristic is integrally formed as a whole in a single film.

2. The method according to claim 1, wherein,
    the germanium film is formed by using an atomic layer deposition method; or
    the germanium film is formed by using a chemical vapor deposition method; or
    the germanium film is formed by using a mechanical exfoliation transferring method; or
    the germanium film is formed by using a magnetron sputtering method; or
    the germanium film is formed by using a pulsed laser deposition method.

3. The method according to claim 1, wherein,
    the halogenation treatment on the germanium film is carried out by using a gas phase method; or
    the halogenation treatment on the germanium film is carried out by using a liquid phase method; or
    the halogenation treatment on the germanium film is carried out by using a surface modification method; or
    the halogenation treatment on the germanium film is carried out by using a plasma treatment method.

4. The method according to claim 3, wherein, in the case where the halogenation treatment on the germanium film is carried out by using a gas phase method, the halogenation treatment on the germanium film comprises:
    carrying out the halogenation treatment on the germanium film under a iodine gas atmosphere with a gas pressure being 1-10 Pa and a treatment temperature being 60-100 Celsius degree, to form a germanium iodide film; or
    carrying out the halogenation treatment on the germanium film under a bromine gas atmosphere with the gas pressure being 1-10 Pa and the treatment temperature being 50-400 Celsius degree, to form a germanium bromide film; or
    carrying out annealing on the germanium film under a chlorine atmosphere at a treatment temperature of 50-400 Celsius degree for 10 minutes, to form a germanium chloride film.

5. The method according to claim 3, wherein, in the case where the halogenation treatment on the germanium film is carried out by using a gas phase method, halogenation treatment on the germanium film comprises:
    carrying out the halogenation treatment on the germanium film under a $BCl_3$ gas atmosphere with a gas pressure being 1-10 Pa and a treatment temperature being 250-350 Celsius degree, and carrying out annealing at 90-130 Celsius degree under halogen gas atmosphere, to form a germanium chloride film.

6. The method according to claim 3, wherein, in the case where the halogenation treatment on the germanium film is carried out by using a surface modification method, the halogenation treatment on the germanium film comprises:
    coating an organic colloidal material comprising a halogen onto a substrate; laminating the substrate on the germanium film via a side of the substrate coated with the organic colloidal material, to make halogen atoms in the organic colloidal material transferred to the germanium film, to achieve the halogenation of the germanium film.

7. The method according to claim 3, wherein, in the case where the halogenation treatment on the germanium film is carried out by using a plasma treatment method, the halogenation treatment on the germanium film comprises:
    bombing a surface of the germanium film by using a halogen plasma in a inductively coupled plasma or a reactive ion etching device, to make the halogen plasma adsorbed in the germanium film, to achieve the halogenation treatment on the germanium film.

8. The method according to claim 1, wherein the functionalization element comprises at least one selected from the group consisting of hydrogen, nitrogen, boron, and sulfur.

9. The method according to claim 1, further comprising, before forming the germanium film on the metal substrate, washing the metal substrate.

10. An electrode plate, comprising a metal substrate and a film comprising germanium being disposed on the metal substrate and having a topological semiconductor characteristic, wherein the film is integrally formed as a whole in a single film, and is formed by carrying out a topology treatment on a germanium film using a functionalization element; and the germanium film consists of germanium;
    wherein the film comprises a germanium halide film formed by carrying out halogenation treatment on a germanium film with at least one selected from the group consisting of fluorine, chlorine, bromine, and iodine.

11. The electrode plate according to claim 10, wherein,
the germanium halide film is a single-atom-layer germanium halide film; or
the germanium halide film is a double-atom-layer germanium halide film; or
the germanium halide film is a multiple-atom-layer germanium halide film.

12. The electrode plate according to claim 10, wherein, the film comprises a topological semiconductor film formed by carrying out topology treatment on a germanium film with at least one selected from the group consisting of hydrogen, nitrogen, boron, and sulfur.

13. The electrode plate according to claim 10, wherein the metal substrate comprises at least one selected from the group consisting of a gold foil, an aluminum foil, a platinum foil, a copper foil, and a nickel foil.

14. An energy storage device, comprising the electrode plate according to claim 10.

15. The energy storage device according to claim 14, wherein the energy storage device comprises a battery or a capacitor.

16. The energy storage device according to claim 14, wherein the film comprises a germanium halide film formed by carrying out halogenation treatment on a germanium film with at least one selected from the group consisting of fluorine, chlorine, bromine, and iodine.

* * * * *